US012608625B2

(12) United States Patent
Mujumdar et al.

(10) Patent No.: US 12,608,625 B2
(45) Date of Patent: Apr. 21, 2026

(54) AUTOMATICALLY TRAINING AND IMPLEMENTING ARTIFICIAL INTELLIGENCE-BASED ANOMALY DETECTION MODELS

(71) Applicant: International Business Machines Corporation, Armonk, NY (US)

(72) Inventors: Shashank Mujumdar, Haryana (IN); Hima Patel, Bengaluru (IN); Sambaran Bandyopadhyay, Bangalore (IN); Pooja Aggarwal, Bangalore (IN); Anbang Xu, San Jose, CA (US); Hau-Wen Chang, San Jose, CA (US); Harshit Kumar, New Delhi (IN); Katherine Guo, San Jose, CA (US); Rama Kalyani T. Akkiraju, San Jose, CA (US); Gargi B. Dasgupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 17/681,984

(22) Filed: Feb. 28, 2022

(65) Prior Publication Data

US 2023/0274160 A1     Aug. 31, 2023

(51) Int. Cl.
G06N 5/022 (2023.01)

(52) U.S. Cl.
CPC ..................................... G06N 5/022 (2013.01)

(58) Field of Classification Search
CPC ..................................................... G06N 5/022
See application file for complete search history.

(56) References Cited

U.S. PATENT DOCUMENTS

| | | |
|---|---|---|
| 8,495,429 B2 | 7/2013 | Fu et al. |
| 10,237,295 B2 | 3/2019 | Zhang et al. |
| 10,530,795 B2 | 1/2020 | Pande et al. |

(Continued)

FOREIGN PATENT DOCUMENTS

WO     WO-2021252815 A1 * 12/2021     ............... G06N 3/08

OTHER PUBLICATIONS

Wikipedia, Constrained Clustering, https://en.wikipedia.org/w/index.php?title=Constrained_clustering&oldid=1000091519 , Jan. 13, 2021.

*Primary Examiner* — Mariela Reyes
*Assistant Examiner* — Alexandria Josephine Miller
(74) *Attorney, Agent, or Firm* — Ryan, Mason & Lewis, LLP

(57)     ABSTRACT

Methods, systems, and computer program products for automatically detecting periods of normal activity by analyzing observability data in IT operations environments are provided herein. A computer-implemented method includes obtaining multiple types of data related to one or more artificial intelligence-related information technology operations; modelling at least a portion of the obtained data as time series data; automatically identifying, from the time series data, one or more time periods associated with one or more given levels of data activity; and performing one or more automated actions, in at least one artificial intelligence-related information technology operations environment, based at least in part on the data corresponding to the one or more identified time periods.

19 Claims, 5 Drawing Sheets

(56)        References Cited

U.S. PATENT DOCUMENTS

| 10,635,563 | B2 | 4/2020 | Salunke et al. | |
| 11,080,127 | B1 | 8/2021 | Vincent et al. | |
| 2012/0016633 | A1 | 1/2012 | Wittenstein et al. | |
| 2018/0316707 | A1 | 11/2018 | Dodson et al. | |
| 2020/0272973 | A1* | 8/2020 | Sun ..................... | G06N 20/00 |
| 2021/0085239 | A1* | 3/2021 | Guidotti ................ | G06N 20/00 |
| 2021/0089927 | A9 | 3/2021 | Ryan et al. | |

* cited by examiner

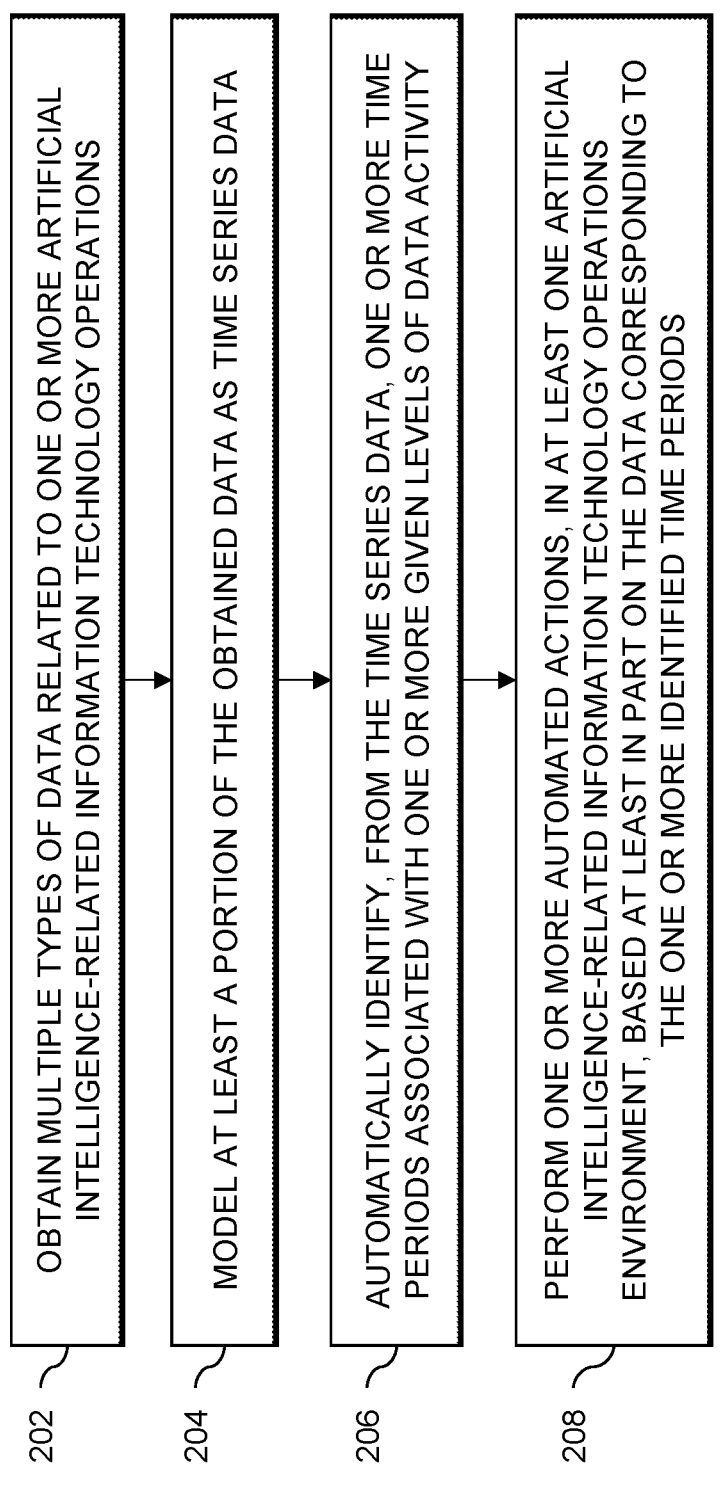

202   OBTAIN MULTIPLE TYPES OF DATA RELATED TO ONE OR MORE ARTIFICIAL INTELLIGENCE-RELATED INFORMATION TECHNOLOGY OPERATIONS

204   MODEL AT LEAST A PORTION OF THE OBTAINED DATA AS TIME SERIES DATA

206   AUTOMATICALLY IDENTIFY, FROM THE TIME SERIES DATA, ONE OR MORE TIME PERIODS ASSOCIATED WITH ONE OR MORE GIVEN LEVELS OF DATA ACTIVITY

208   PERFORM ONE OR MORE AUTOMATED ACTIONS, IN AT LEAST ONE ARTIFICIAL INTELLIGENCE-RELATED INFORMATION TECHNOLOGY OPERATIONS ENVIRONMENT, BASED AT LEAST IN PART ON THE DATA CORRESPONDING TO THE ONE OR MORE IDENTIFIED TIME PERIODS

FIG. 2

AUTOMATICALLY TRAINING AND IMPLEMENTING ARTIFICIAL INTELLIGENCE-BASED ANOMALY DETECTION MODELS

BACKGROUND

The present application generally relates to information technology (IT) and, more particularly, to data processing techniques. More specifically, conventional log anomaly detection approaches typically require training data that do not contain anomalous logs, and filtering such data is carried out manually in connection with such conventional approaches. As a result, such approaches are commonly error-prone as well as time- and resource-intensive.

SUMMARY

In at least one embodiment, techniques for automatically training and implementing artificial intelligence-based anomaly detection models are provided. An example computer-implemented method includes obtaining multiple types of data related to one or more artificial intelligence-related information technology operations, modelling at least a portion of the obtained data as time series data, and automatically identifying, from the time series data, one or more time periods associated with one or more given levels of data activity. The method also includes performing one or more automated actions, in at least one artificial intelligence-related information technology operations environment, based at least in part on the data corresponding to the one or more identified time periods.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating techniques according to an example embodiment of the invention;

DETAILED DESCRIPTION

Figure 1:
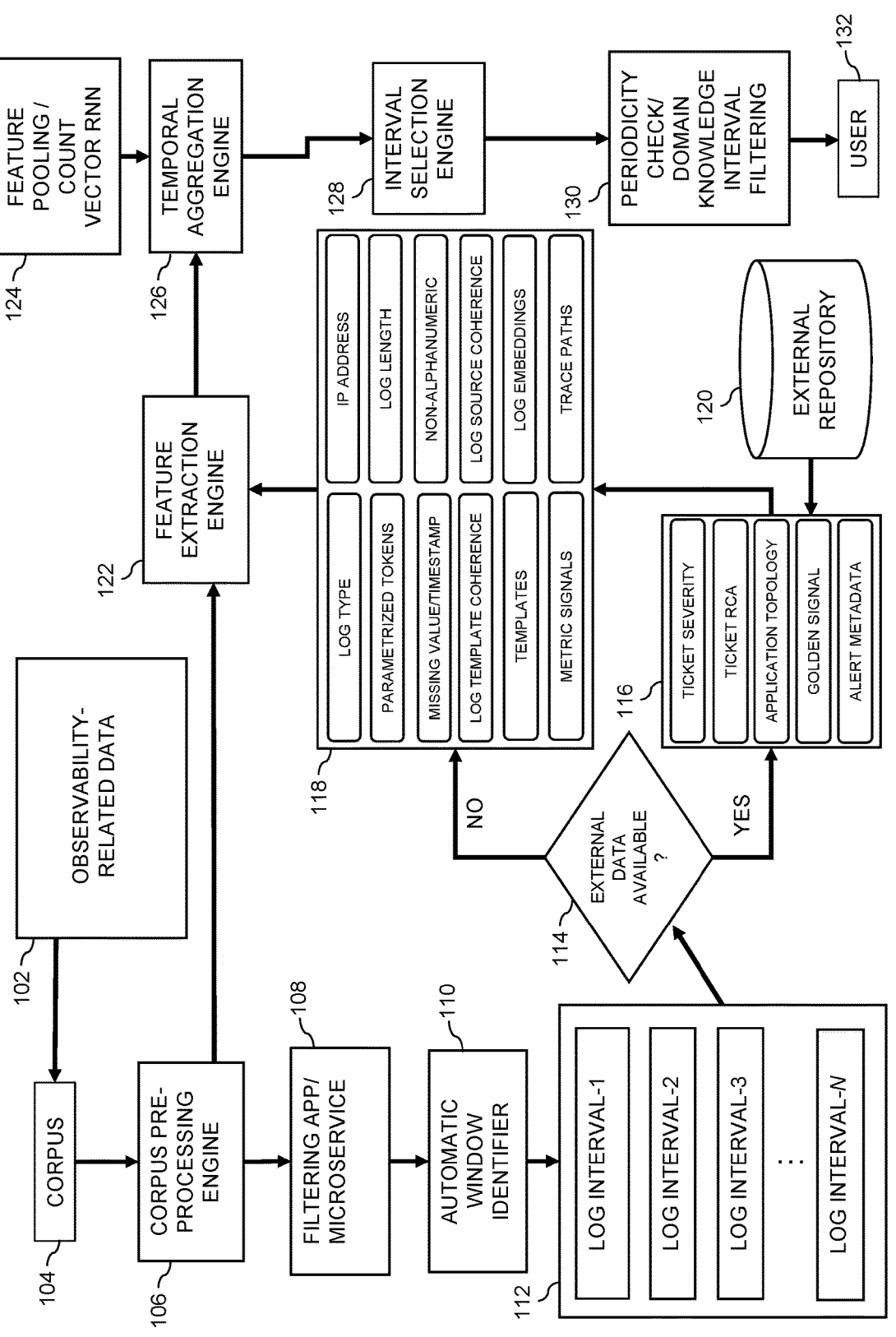
FIG. 1 is a diagram illustrating system architecture, according to an example embodiment of the invention.

As described herein, at least one embodiment includes automatically selecting observability data for downstream artificial intelligence-related information technology operations (AIOPs). As used herein, AIOPs refers to and/or can include at least one application of artificial intelligence directed towards automating operations through advanced analytics on input data (e.g., such that a given IT operations team can utilize those insights to take one or more related decisions). Such an embodiment includes automatically identifying one or more normal intervals of data utilizing multiple sources of observability data from at least one given corpus, and using such identified data to train at least one downstream anomaly detection model in IT operations environments. As used in this context, "normal" refers to activity levels shown in the relevant data. Specifically, in one or more embodiments, "normal" refers to the intervals and/or time periods of the data that do not show any abnormal signals. Typically, abnormal signals would be seen in the data when there is at least one event that occurs to disrupt normal behavior (e.g., server downtime would likely result in system logs that indicate an abnormal pattern in the data). A "normal" pattern in a given set of data can be determined, for example, after analyzing multiple input sources and advanced analytics.

Sources of observability data can include, by way merely of example, one or more data logs, one or more data metrics, one or more data traces, and/or one or more other forms of AIOPs data such as alerts, topology information, golden signals, incident information, etc. As used in this context, "observability" refers to the monitoring, tracking, and triaging of incidents to prevent downtime. Observability data can include various data sources that enable the above, such as, for example, metrics, logs, traces, alerts, topology, golden signals and incident information, and drive advanced analytics.

One or more embodiments include extracting log template signals, metrics traces, etc. (such as noted above), and modeling at least a portion of such extracted data as time-series data to generate a candidate set of normal log and/or metric intervals. Such an embodiment also includes aggregating log signals across one or more time windows to generate representations for intervals, and using alert data, golden signal data, topology data and/or incident data as input and extracting therefrom one or more key features to filter the candidate set of normal log and/or metric intervals. In one or more embodiments, such filtering can be carried out by generating a ranked list of intervals in descending order of the abnormality score (which can be determined, as further detailed herein, in connection with using one or more clustering algorithms), and removing (i.e., filtering out) the top ranked intervals.

As also further detailed herein, at least one embodiment includes detecting appropriate normal time intervals for given observability data by learning and/or understanding related trends, seasonality information, periodicity information, etc. Additionally, such an embodiment can include generating candidate intervals by automatically identifying the appropriate window size. Identifying an appropriate window size can include, for example, utilizing historic metric data to train a time-series prediction model using a sliding window approach, and identifying a seed window size corresponding to the best prediction model. Further, one or more embodiments can also include analyzing log message properties in a given temporal domain, which can include the following steps: detecting seasonality and/or periodicity for the seed window size; identifying and/or determining a mean signal to make one or more trends robust to noise; identifying a number of events that break and/or vary from at least a portion of the one or more trends; if the number of identified events is less than a pre-defined threshold, outputting the optimal window size; and extending or reducing the seed window size and repeating the above-noted steps, as necessary.

Further, one or more embodiments include incorporating feedback (e.g., from one or more domain experts) for candidates that have higher separation scores (as further detailed herein with respect to representative log lines), and using such feedback to further train and/or fine-tune the underlying clustering algorithm based on constrained clustering. As used herein, and as further detailed herein, a separation score is utilized to determine the set of candidate intervals for which feedback from domain experts needs to be collected.

Accordingly, at least one embodiment includes automated bootstrapping of a log anomaly detection system by selecting a subset of data from at least one input corpus that can serve as training data for the log anomaly detection pipeline. Such data selection can be carried out, for example, by combining data from various sources (e.g., logs, tickets, incidents, topology information, alerts, etc.). Such an embodiment also includes automatically identifying one or more time periods corresponding to at least a portion of the selected subset of data (also referred to herein as "normal" data) for training (using the data from the one or more identified time periods) an anomaly detection model in at least one IT operations environment.

FIG. 1 is a diagram illustrating system architecture, according to an embodiment of the invention. By way of illustration, FIG. 1 depicts observability-related data 102 (e.g., logs, traces, metrics, etc.), which is provided to and/or input to corpus 104. At least a portion of the data in corpus 104 is processed by corpus preprocessing engine 106, which ingests the corpus of logs to parse and standardize at least a portion of the logs (e.g., generate key-value pairs) and further identify one or more log templates, and at least a portion of the preprocessed data is then filtered using at least one filtering application (app) and/or microservice 108. Based on the results of the filtering application and/or microservice 108, automatic window identifier 110 determines one or more temporal intervals 112 (e.g., log interval-1, log interval-2, log interval-3, . . . log interval-N) associated with the data.

As also depicted in FIG. 1, step 114 includes determining, based at least in part on the temporal intervals 112, if relevant external data are available. If yes (that is, external data are available), then at least a portion of such external data 116 (e.g., ticket severity data, ticket root cause analysis (RCA) data, application topology data, golden signal data, alert metadata, etc.), which is derived from external repository 120, is incorporated into and/or processed as part of dataset 118. If no (that is, external data are not available), then dataset 118 is utilized with no additional inputs and/or processing from external data. By way merely of example, and as depicted for illustrative purposes in FIG. 1, dataset 118 can include data pertaining to log type, parameterized tokens, missing values and/or timestamps, log template coherence, templates, metric signals, internet protocol (IP) addresses, log length, non-alphanumeric information, log source coherence, log embeddings, trace paths, etc.

Feature extraction engine 122 determines and/or derives one or more data features from dataset 118, and provides at least a portion of such results to temporal aggregation engine 126, which also receives inputs from feature pooling and/or count vector recurrent neural network (RNN) 124. In at least one embodiment, feature extraction engine 122 generates features by analyzing actual log lines and associated templates, and/or by analyzing input metric data and trace paths. Additionally, with respect to feature pooling and/or count vector RNN 124, feature pooling is carried out to aggregate features across logs in a given interval and generate a feature representation for the interval, and such outputs are achieved through a RNN (i.e., a deep neural network architecture). The temporal aggregation engine 126, by processing at least a portion of such above-noted inputs, provides aggregated data to interval selection engine 128. In one or more embodiments, the temporal aggregation engine 126 generates a feature representation for the interval from the features computed for the logs in that interval.

The interval selection engine 128, based at least in part on processing the aggregated data, generates an output, which can include, for example, a ranked list of the intervals based on the corresponding input interval features. In one or more embodiments, the ranked list can be sorted based on the identified abnormality score (which internally uses clustering). Such an output is then provided to and/or processed in connection with periodicity checking and/or domain knowledge interval filtering in step 130. In at least one embodiment, analysis of periodic signals present in the time series observability data is carried out to filter certain intervals of logs that may have been flagged as abnormal by interval selection engine 128, but are periodic in nature and can be safely ignored. Similarly, domain knowledge of certain events determined from external data 116 can be used to filter intervals that might be marked as abnormal by interval selection engine 128 but can be safely ignored. The results of step 130 are then provided to and/or output to user 132.

As noted in connection with FIG. 1 and detailed herein, one or more embodiments include determining and/or identifying one or more appropriate temporal window sizes with respect to observability data. Such an embodiment can include utilizing historic metric data to train a time-series prediction model using a sliding window approach, identifying a seed window size corresponding to the best prediction model, and analyzing log message properties in the temporal domain. In one or more embodiments, analyzing log message properties in the temporal domain can include detecting seasonality and/or periodicity for seed window size, determining a mean signal to render trends robust to noise, and identifying one or more events that break one or more such trends. If the number of identified events is less than a predefined threshold, at least one embodiment can include outputting the optimal window size in accordance therewith. If the number of identified events is greater than a predefined threshold, such an embodiment includes extending and/or reducing seed window size and repeating the other above-noted steps.

As additionally illustrated in FIG. 1 and further detailed herein, one or more embodiments include utilizing external resources. By way of example, such external resources can include external metadata pertaining to alerts and/or golden signals, which can help in filtering out the log and/or metric time windows during which there are alerts or error rate golden signals. Additionally or alternatively, incident data can be used to help in determining the root cause of an issue in terms of affected services, which can facilitate filtering out candidate log time windows for those services which are affected during an incident. Further, log time windows for other services can be considered as candidates.

Also, with respect to external metadata, ticket RCA data and/or reports can be used in connection with identifying applications and/or microservices that were affected by a given issue, and can help filter potential candidates. Further, application topology information can be used in further refining such candidate sets by considering blast radius information.

One or more embodiments can also include using template signals, metrics and traces. Such an embodiment can include extracting template signals from logs. By way of example, given a set of logs, at least one embodiment can include partitioning and/or dividing the logs into different time windows at an individual microservice level, and utilizing regular expression pattern mining to convert the logs to a templatized format. Such an embodiment further includes classifying templates into multiple types of events such as, by way merely of example, periodic events, silent events, and noise events, by modelling the log data as time series. Periodic events can, for example, be events that are generated by daemons and/or by events that deal with monitoring information, and one or more embodiments can include using auto-correlation to identify the periodicity of such a template. With respect to silent events, a significant portion of the signal is a flat line around the zero value, and only occasionally are messages transmitted (e.g., error messages). Further, noise events can include busy signals associated with sending notifications often. Such notifications can include, for example, warning messages that are generated in cases of failures and in cases of normal behavior when a problem is corrected.

As also detailed herein, one or more embodiments include utilizing metrics and traces. Such an embodiment can include extracting various resource-specific metrics (and, similarly, traces) such as central processing unit (CPU), memory, network usage details, etc., and sampling such metrics at desired intervals to generate time series data. Once time series data are generated, such an embodiment includes classifying portions of the time series data as related to periodic events, silent events and/or noise events, as discussed above.

Additionally, at least one embodiment includes generating interval features, which can be used in one or more machine learning algorithms. By way of example, by capturing and/or processing at least one profile of log messages in a given interval, log features such as the following can be generated: log type (e.g., information, warning, error, etc.), IP address, parametrized tokens, log length (e.g., the ratio of log message token length to the mean), missing values and/or timestamps, non-alphanumeric information (e.g., the ratio of non-alphanumeric characters to total characters), good and bad templates (e.g., the ratio of templates with arguments versus keywords), and log embeddings (e.g., pre-trained word embeddings of the text present in each log).

As also detailed in connection with FIG. 1, one or more embodiments include implementing temporal aggregation. For example, in connection with analyzing intervals (comprising of a set of logs generated in that time interval) in the log corpus, such an embodiment can include using a set of pooling and/or aggregation mechanisms to convert log features to interval features. Such mechanisms can include, for example, an average aggregation mechanism, which includes taking the average of multiple log feature vectors. Such mechanisms can also include a minimum aggregation mechanism, which includes taking the minimum of each dimension of multiple log feature vectors. Further, such mechanisms can include a maximum aggregation mechanism, which includes taking the maximum of each dimension of multiple log feature vectors.

Additionally or alternatively, capturing and/or processing different distributions of logs in an interval can facilitate determining and/or generating direct interval features. Such features can include, for example, log template coherence, which represents a normalized entropy score of log template frequencies, and log source coherence, which represents a normalized entropy score of log source frequencies.

As also detailed herein, at least one embodiment includes log anomaly detection model training and implementation for detecting outliers. In such an embodiment, features of at least a portion of the (time) intervals are fed to and/or processed by a centroid-based clustering algorithm (e.g., k-means++), and techniques such as elbow and silhouette methods can be used to determine the number of clusters. An outlier score for each interval is determined by the distance of the interview from the interval's cluster center, wherein the greater the distance, the greater the outlier score.

One or more embodiments additionally include selecting candidates for feedback from one or more domain experts, and incorporating at least a portion of such feedback to improve and/or fine-tune the underlying clustering algorithm. In such an embodiment, each cluster includes batches of multiple log intervals, and in each cluster, for each log interval, such an embodiment includes identifying representatives by calculating a cohesiveness measure, which captures log lines that are closest to other log lines in the cluster. Cohesiveness can be captured, for example, by measuring the similarity of log lines that are encoded into features. An example algorithm that can be implemented for achieving this includes encoding the log lines into features using a word2vec model and comparing the similarity by computing the cosine similarity metric.

For each representative log line, one or more embodiments include computing the log line's separation from other log lines within the cluster, wherein separation represents another clustering metric and captures how far away the log lines are in a given cluster from the representative log line. Log lines that have higher separation values potentially do not belong to the cluster, and such log lines are candidates for which feedback from domain experts can be obtained.

By way of example, domain expert feedback pertaining to a log line can include designations of MUST-LINK or CANNOT-LINK. A MUST-LINK designation indicates that the log line must belong to the given cluster, and a CANNOT-LINK designation indicates that the log line should not belong to the given cluster. Such MUST-LINK and CANNOT-LINK feedback can be incorporated by the underlying clustering algorithm to further fine-tune and/or improve the clustering of log lines.

FIG. 2 is a flow diagram illustrating techniques according to an embodiment of the present invention. Step 202 includes obtaining multiple types of data related to one or more artificial intelligence-related information technology operations. In at least one embodiment, obtaining multiple types of data related to one or more artificial intelligence-related information technology operations includes obtaining one or more of log data, metrics data, data traces, alert data, topology data, golden signal data, and incident data.

Step 204 includes modelling at least a portion of the obtained data as time series data. One or more embodiments also include generating, using the time series data, a candidate set of time periods associated with the one or more given levels of data activity. Such an embodiment can additionally include extracting one or more features from the multiple types of data related to one or more artificial intelligence-related information technology operations, and filtering, using at least a portion of the one or more features, the candidate set of time periods associated with the one or more given levels of data activity.

Step 206 includes automatically identifying, from the time series data, one or more time periods associated with one or more given levels of data activity. In at least one embodiment, automatically identifying one or more time periods associated with one or more given levels of data activity includes determining at least one of one or more trends, seasonality information, and periodicity information, by processing the time series data. Additionally or alternatively, automatically identifying one or more time periods associated with one or more given levels of data activity can include automatically identifying a duration value for the one or more time periods.

One or more embodiments also include generating a representation for each of the one or more time periods associated with one or more given levels of data activity by aggregating at least a portion of the time series data across one or more time periods.

Step 208 includes performing one or more automated actions, in at least one artificial intelligence-related information technology operations environment, based at least in part on the data corresponding to the one or more identified time periods. In at least one embodiment, performing one or more automated actions includes detecting one or more anomalies in one or more data sources associated with the at least one artificial intelligence-related information technology operations environment. Additionally or alternatively, performing one or more automated actions can include processing feedback for at least a portion of the candidate set of time periods associated with the one or more given levels of data activity, and updating at least one clustering algorithm based at least in part on the feedback.

Performing one or more automated actions can also include, for example, training one or more artificial intelligence-based anomaly detection models using the data corresponding to the one or more identified time periods. Such an embodiment can include using a log anomaly training model, such as an unsupervised model such as Principal Component Analysis (PCA).

Further, in one or more embodiments, software implementing the techniques depicted in FIG. 2 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
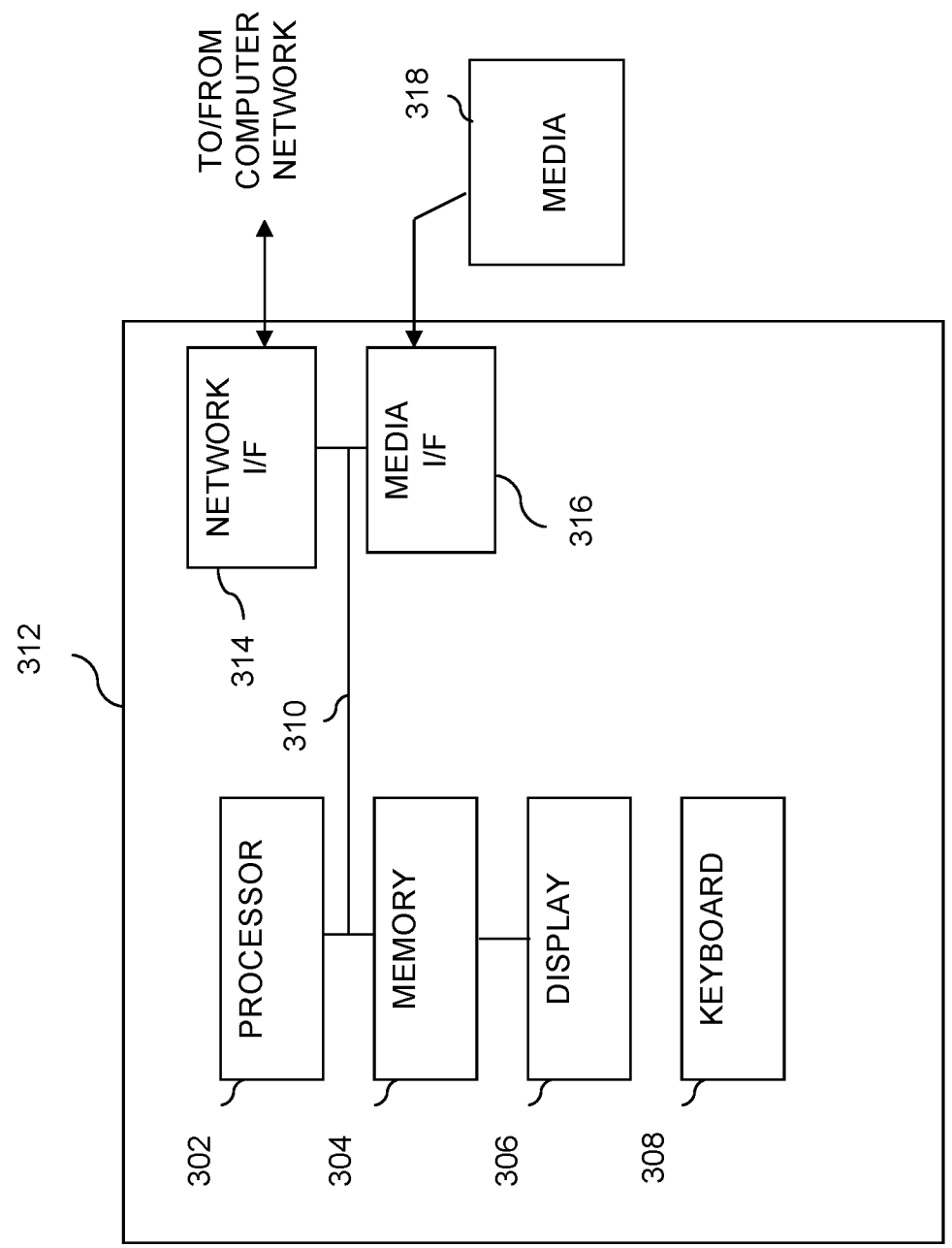
FIG. 3 is a system diagram of an example computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor

302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
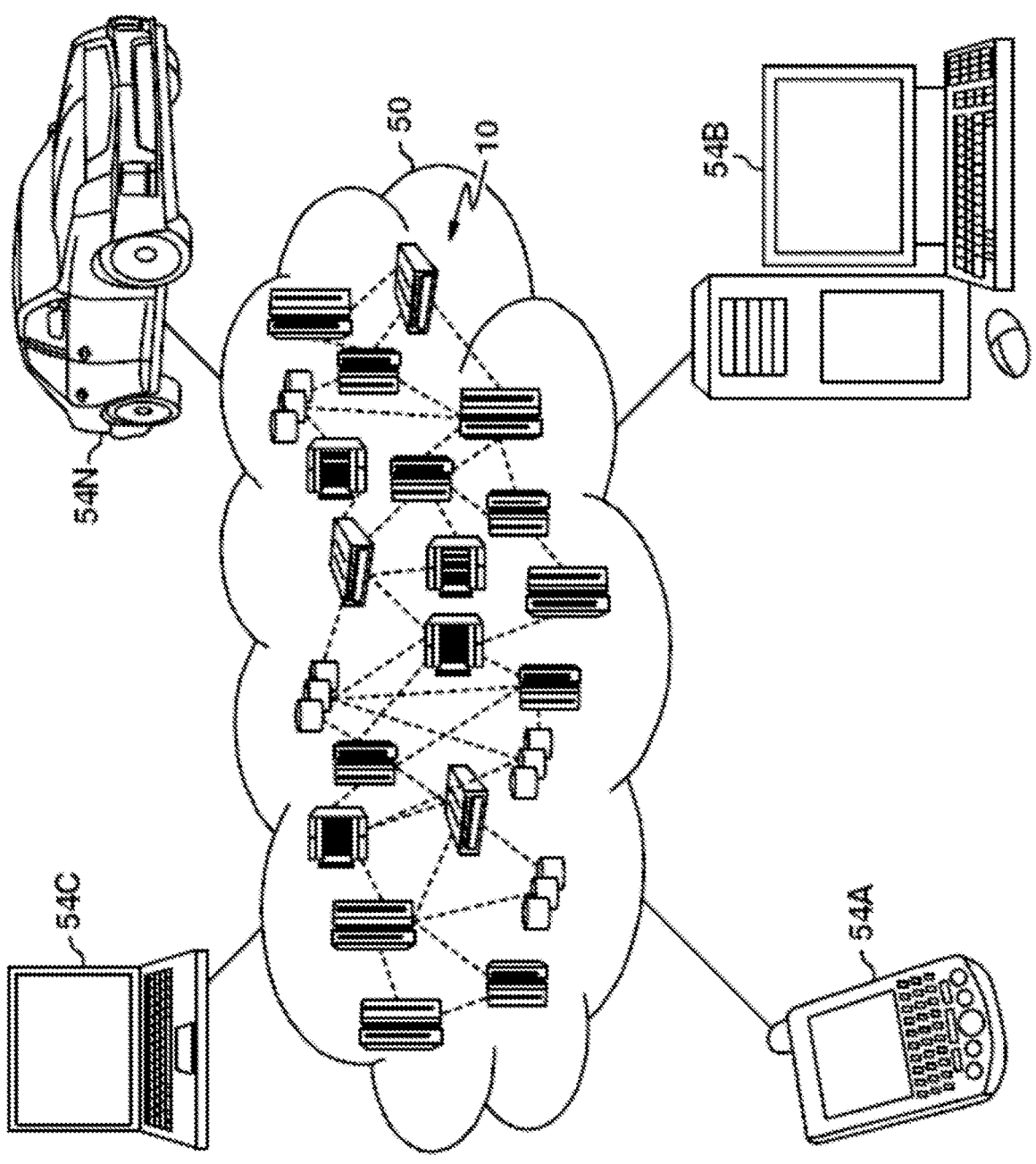
FIG. 4 depicts a cloud computing environment according to an example embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
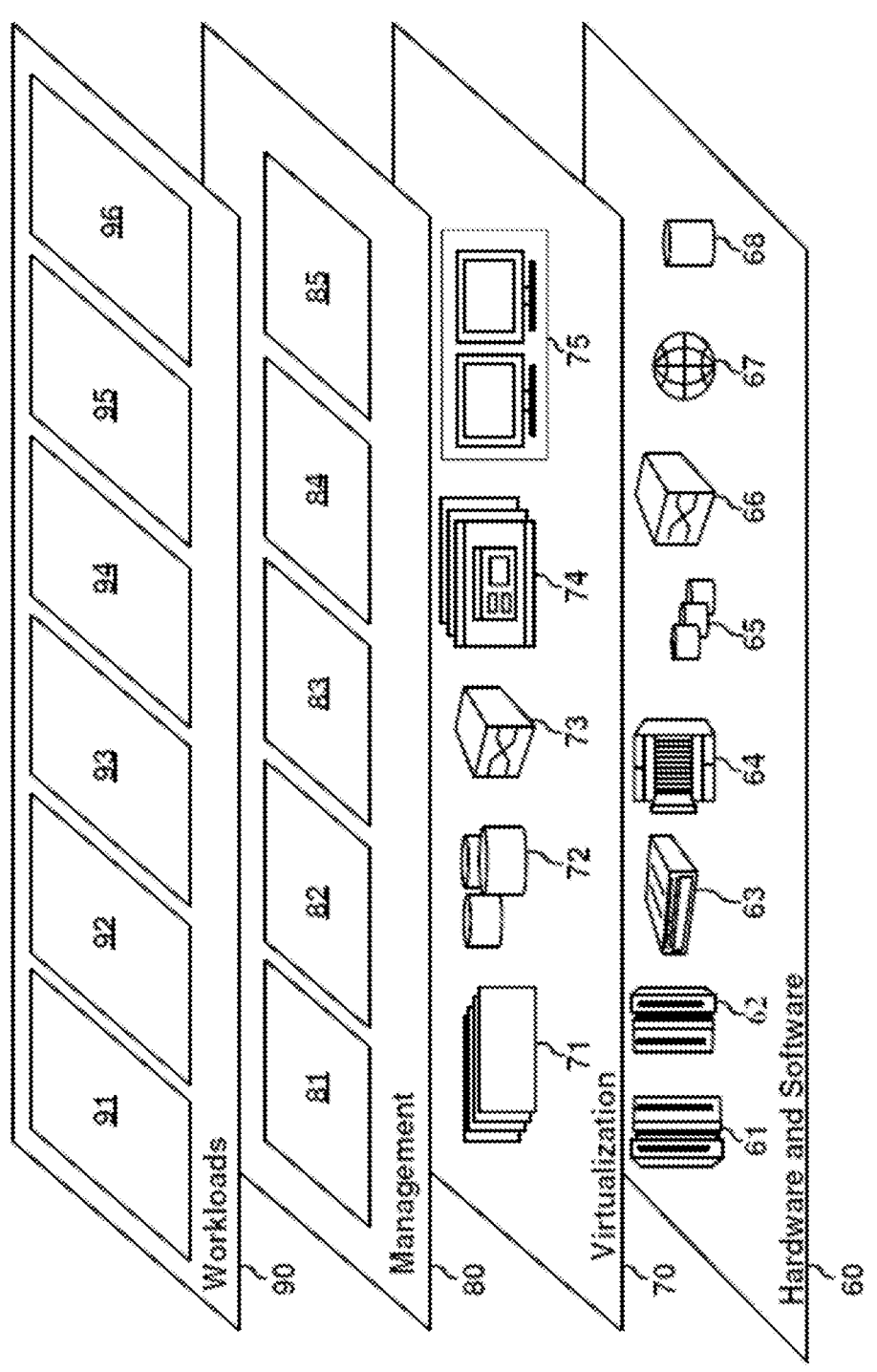
FIG. 5 depicts abstraction model layers according to an example embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AIOPs model training 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically training and implementing artificial intelligence-based anomaly detection models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining multiple types of data related to one or more artificial intelligence-related information technology operations;

modelling at least a portion of the obtained data as time series data;

generating, using the time series data, a candidate set of time periods associated with one or more expected levels of data activity;

extracting features from the multiple types of data related to one or more artificial intelligence-related information technology operations;

generating, using one or more of feature pooling techniques and at least one count vector-based recurrent neural network, a representation for each of at least a portion of time periods in the candidate set of time periods in connection with aggregating at least a portion of the extracted features;

automatically identifying, from the candidate set of time periods and based at least in part on the generated representation for each of the at least a portion of time periods in the candidate set of time periods, a subset of one or more time periods associated with the one or more expected levels of data activity, wherein automatically identifying the one or more time periods comprises automatically determining, using at least one sliding window technique, one or more data window sizes related to the one or more expected levels of data activity; and performing one or more automated actions, in at least one artificial intelligence-related information technology operations environment, based at least in part on the data corresponding to the one or more identified time periods, wherein performing one or more automated actions comprises:

training at least one artificial intelligence-based anomaly detection model using the data corresponding to the one or more identified time periods;

detecting one or more anomalies in one or more data sources associated with the at least one artificial intelligence-related information technology operations environment by processing data from the one or more data sources using the at least one trained artificial intelligence-based anomaly detection model; and initiating, based at least in part on the one or more detected anomalies, at least one automated action in connection with at least one system associated with the at least one artificial intelligence-related information technology operations environment;

wherein the method is carried out by at least one computing device.

2. The computer-implemented method of claim 1, further comprising:

filtering, using the at least a portion of the extracted features, the candidate set of time periods associated with the one or more expected levels of data activity.

3. The computer-implemented method of claim 1, wherein performing one or more automated actions comprises:

processing feedback for at least a portion of the candidate set of time periods associated with the one or more expected levels of data activity; and updating at least one clustering algorithm based at least in part on the feedback.

4. The computer-implemented method of claim 1, wherein automatically identifying the subset of one or more time periods associated with one or more expected levels of data activity comprises determining at least one of one or more trends, seasonality information, and periodicity information, by processing the time series data.

5. The computer-implemented method of claim 1, wherein automatically identifying the subset of one or more time periods associated with one or more expected levels of data activity comprises automatically identifying at least one duration value for the subset of one or more time periods.

6. The computer-implemented method of claim 1, wherein obtaining multiple types of data related to one or more artificial intelligence-related information technology operations comprises obtaining one or more of log data, metrics data, data traces, alert data, topology data, golden signal data, and incident data.

7. The computer-implemented method of claim 1, wherein software implementing the method is provided as a service in a cloud environment.

8. A computer program product comprising a computer readable storage medium having program instructions embodied therewith, the program instructions executable by a computing device to cause the computing device to:

obtain multiple types of data related to one or more artificial intelligence-related information technology operations;

model at least a portion of the obtained data as time series data;

generate, using the time series data, a candidate set of time periods associated with one or more expected levels of data activity;

extract features from the multiple types of data related to one or more artificial intelligence-related information technology operations;

generate, using one or more of feature pooling techniques and at least one count vector-based recurrent neural network, a representation for each of at least a portion of time periods in the candidate set of time periods in connection with aggregating at least a portion of the extracted features;

automatically identify, from the candidate set of time periods and based at least in part on the generated representation for each of the at least a portion of time periods in the candidate set of time periods, a subset of one or more time periods associated with the one or more expected levels of data activity, wherein automatically identifying the one or more time periods comprises automatically determining, using at least one sliding window technique, one or more data window sizes related to the one or more expected levels of data activity; and perform one or more automated actions, in at least one artificial intelligence-related information technology operations environment, based at least in part on the data corresponding to the one or more identified time periods, wherein performing one or more automated actions comprises:

training at least one artificial intelligence-based anomaly detection model using the data corresponding to the one or more identified time periods;

detecting one or more anomalies in one or more data sources associated with the at least one artificial intelligence-related information technology operations environment by processing data from the one or more data sources using the at least one trained artificial intelligence-based anomaly detection model; and initiating, based at least in part on the one or more detected anomalies, at least one automated action in connection with at least one system associated with the at least one artificial intelligence-related information technology operations environment.

9. The computer program product of claim 8, wherein the program instructions executable by a computing device further cause the computing device to:

filter, using the at least a portion of the extracted features, the candidate set of time periods associated with the one or more expected levels of data activity.

10. The computer program product of claim 8, wherein performing one or more automated actions comprises:

processing feedback for at least a portion of the candidate set of time periods associated with the one or more expected levels of data activity; and updating at least one clustering algorithm based at least in part on the feedback.

11. The computer program product of claim 8, wherein automatically identifying the subset of one or more time periods associated with one or more expected levels of data activity comprises determining at least one of one or more trends, seasonality information, and periodicity information, by processing the time series data.

12. The computer program product of claim 8, wherein obtaining multiple types of data related to one or more artificial intelligence-related information technology operations comprises obtaining one or more of log data, metrics data, data traces, alert data, topology data, golden signal data, and incident data.

13. The computer program product of claim 8, wherein automatically identifying the subset of one or more time periods associated with one or more expected levels of data activity comprises automatically identifying at least one duration value for the subset of one or more time periods.

14. A system comprising:

a memory configured to store program instructions; and a processor operatively coupled to the memory to execute the program instructions to:

obtain multiple types of data related to one or more artificial intelligence-related information technology operations;

model at least a portion of the obtained data as time series data;

generate, using the time series data, a candidate set of time periods associated with one or more expected levels of data activity;

extract features from the multiple types of data related to one or more artificial intelligence-related information technology operations;

generate, using one or more of feature pooling techniques and at least one count vector-based recurrent neural network, a representation for each of at least a portion of time periods in the candidate set of time periods in connection with aggregating at least a portion of the extracted features;

automatically identify, from the candidate set of time periods and based at least in part on the generated representation for each of the at least a portion of time periods in the candidate set of time periods, a subset of one or more time periods associated with the one or more expected levels of data activity, wherein automatically identifying the one or more time periods comprises automatically determining, using at least one sliding window technique, one or more data window sizes related to the one or more expected levels of data activity; and perform one or more automated actions, in at least one artificial intelligence-related information technology operations environment, based at least in part on the data corresponding to the one or more identified time periods, wherein performing one or more automated actions comprises:

training at least one artificial intelligence-based anomaly detection model using the data corresponding to the one or more identified time periods;

detecting one or more anomalies in one or more data sources associated with the at least one artificial intelligence-related information technology operations environment by processing data from the one or more data sources using the at least one trained artificial intelligence-based anomaly detection model; and initiating, based at least in part on the one or more detected anomalies, at least one automated action in connection with at least one system associated with the at least one artificial intelligence-related information technology operations environment.

15. The system of claim 14, wherein the processor is operatively coupled to the memory to further execute the program instructions to:

filter, using the at least a portion of the extracted features, the candidate set of time periods associated with the one or more expected levels of data activity.

16. The system of claim 14, wherein performing one or more automated actions comprises:

processing feedback for at least a portion of the candidate set of time periods associated with the one or more expected levels of data activity; and updating at least one clustering algorithm based at least in part on the feedback.

17. The system of claim 14, wherein automatically identifying the subset of one or more time periods associated with one or more expected levels of data activity comprises automatically identifying at least one duration value for the subset of one or more time periods.

18. The system of claim 14, wherein automatically identifying the subset of one or more time periods associated with one or more expected levels of data activity comprises determining at least one of one or more trends, seasonality information, and periodicity information, by processing the time series data.

19. The system of claim 14, wherein obtaining multiple types of data related to one or more artificial intelligence-related information technology operations comprises obtaining one or more of log data, metrics data, data traces, alert data, topology data, golden signal data, and incident data.

* * * * *